April 11, 1950  K. A. HENDEL  2,503,734

BENDABLE FILM SPOOL SIGNAL

Filed Jan. 8, 1947

KENNETH A. HENDEL
*INVENTOR*

BY *Newton M. Perrins.*
*Donald H. Stewart.*
*ATTORNEYS*

Patented Apr. 11, 1950

2,503,734

UNITED STATES PATENT OFFICE 2,503,734

BENDABLE FILM SPOOL SIGNAL

Kenneth A. Hendel, Rochester, N. Y., assignor to Eastman Kodak Company, Rochester, N. Y., a corporation of New Jersey Application January 8, 1947, Serial No. 720,797

1 Claim. (Cl. 242—70)

This invention relates to photography and more particularly to a means preferably integral with the spool for indicating to the operator when film on a spool has been exposed. One object of my invention is to provide a simple signaling device incorporated in the spool which will indicate to an operator the condition of film wound thereon. Another object of my invention is to provide a spool with a simple type of indicating means which is automatically operable by placing the spool in a camera. A further object of my invention is to provide a device of the class described which does not increase the cost of the film spool. Other objects will appear from the following specification, the novel features being particularly pointed out in the claims at the end thereof.

In certain types of film cameras utilizing 35-mm. film, for instance, film is supplied in a casing, or retort, which is loaded into the camera, the film being then attached to a take-up hub. The film is wound onto this hub intermittently as exposures are being made and then is usually returned, or rewound, on the original spool and completely into the retort. Since the film projects from the retort when the film package goes to a customer and since it is totally enclosed in a retort when rewound, no special type of signal is required. However, it has been proposed to provide cameras in which film is wound from and then back onto a supply spool where the film is wound directly on a spool so that some form of signal is necessary to indicate to an operator when film on the spool has been exposed. This idea is not broadly new, nor is the camera for using it, as evidenced by the following patents:

2,236,278, Film winding apparatus, Mihalyi, granted December 7, 1943.
2,367,514, Exposure indicating spool, Mihalyi, granted January 16, 1945.

However, in the film spool signal referred to in the patent, the signal is a separate member which must be properly assembled in the hub of the spool as the spool is made, or, as the film package is prepared, so this not only adds an item of additional expense but it requires a separate part which must be separately assembled. In accordance with my improved form of film spool, I provide an integral signal which requires no extra parts which must be assembled when the film spool is assembled and which is both inexpensive to manufacture and assemble.

Coming now to the drawings wherein like reference characters denote like parts throughout:

My invention broadly consists in providing a signal forming a part of one of the film spool flanges, this signal being arranged so that it may be readily bent from a position in which it indicates the film has not been exposed to a position in which it indicates the film has been exposed. My invention includes providing a supporting post for the film spool which will support the spool and which will also automatically bend the signal when the spool is loaded onto the post.

Figure 1:
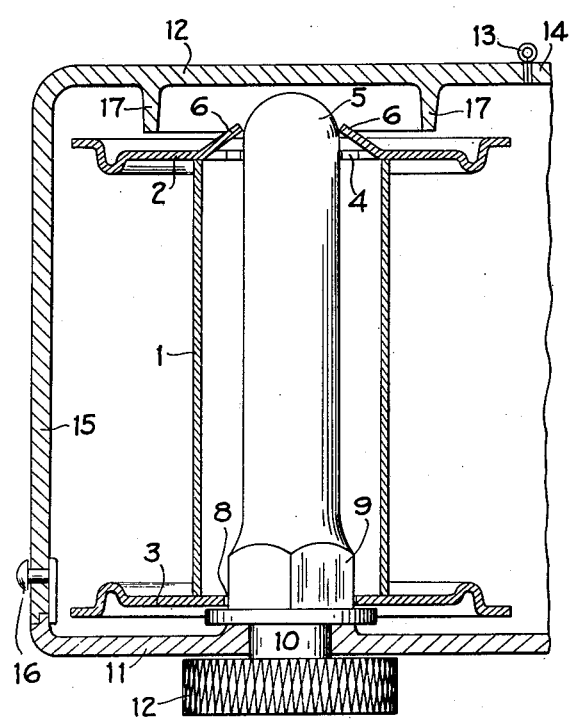
Fig. 1 is a fragmentary sectional view showing a portion of a camera and a film-supporting shaft carrying a spool constructed in accordance with and embodying a preferred form of my invention, the spool being shown in section in operative position on the supporting shaft and the film being omitted for clearness.

More specifically, as indicated in Fig. 1, my spool may include a tubular hub member 1 which may be affixed to flanges 2 and 3 as by spot-welding, soldering, or the like. The upper flange 2, as indicated in Fig. 2, is provided with a generally round opening 4 to receive the rounded end 5 of a film-supporting post and the metal of the flange 2 is provided with two inwardly-extending fingers 6 which project at least part-way into the central opening 4 for supporting the shaft and which are preferably formed by making slots 7 in the metal 2 so that the fingers may be readily bent.

The lower flange 3 is provided with a generally rectangular opening 8, in the present instance this rectangular opening being of a size to receive a rectangular end 9 on the supporting shaft which may be turned through a shaft 10 passing through the camera wall 11 by means of a knurled knob 12. In loading the film spool into the camera, the squared opening 8 is first inserted over the shaft 5 and the spool is moved downwardly until the fingers 6 strike the rounded end 5 of the shaft, so that further movement of the spool bends the signal fingers upwardly from a position in which they lie flush with the major plane of the flange 2. Thus, if the fingers 6 project only slightly into the rounded cut-out 4, they may be bent up at only a slight angle, as indicated in Fig. 1, by the loading operation. The flange of the film spool must, of course, be made of a non-springy, relatively-soft metal, so that these fingers will readily bend into the position shown.

The camera wall 12 may be hinged at 13 to the camera body 14 so that this wall and an end wall 15 may be swung outwardly and upwardly to open the camera when a latch member 16 is operated. When in the open position, the film spool can be inserted axially over the camera supporting shaft and when the hinged door 12 is closed, the spool may be held in an operative position by means of a ring 17 which lies close to the flange 2 when the film spool is in an operative position. If not properly positioned on the camera shaft, the door may not be closed. This insures that the operator will insert the spool the required distance on the supporting shaft.

Figure 2:
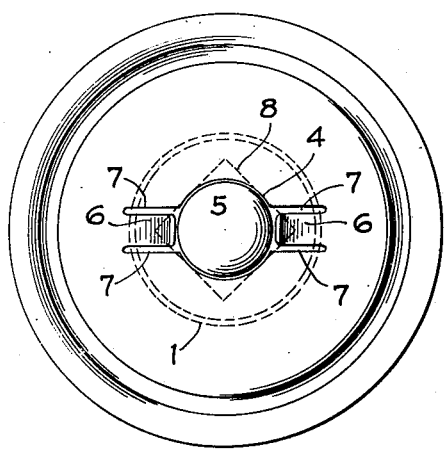
Fig. 2 is a top plan view of the film spool shown in Fig. 1.
Figure 3:
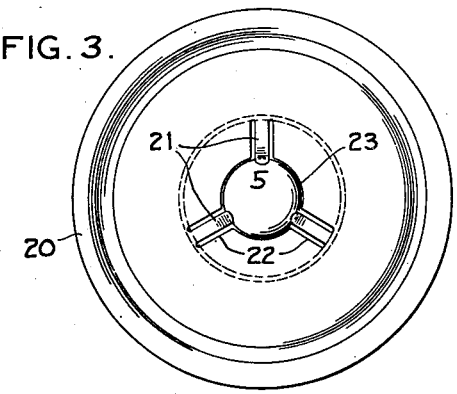
Fig. 3 is a view similar to Fig. 2 but showing a slightly different embodiment of my invention.

The formation of the bendable signals, or fingers, 6, may, of course, take different forms and although the form shown in Figs. 1 and 2 is a preferred form, the arrangement of Fig. 3, or other arrangements, may be used, if desired. In accordance with Fig. 3, the film spool flange 20 is provided with three inwardly-projecting fingers 21 which are quite narrow and relatively long since they are formed by slotting the flange 20, as indicated at 22. These fingers, as in the first embodiment, project partially into a rounded opening 23 to receive the end of the camera shaft 5. Thus, when the spool is thrust on the shaft, these fingers will be bent permanently outwardly, thereby notifying an operator when the spool has been removed that it has once been placed in the camera and that the film should be exposed.

Figure 4:
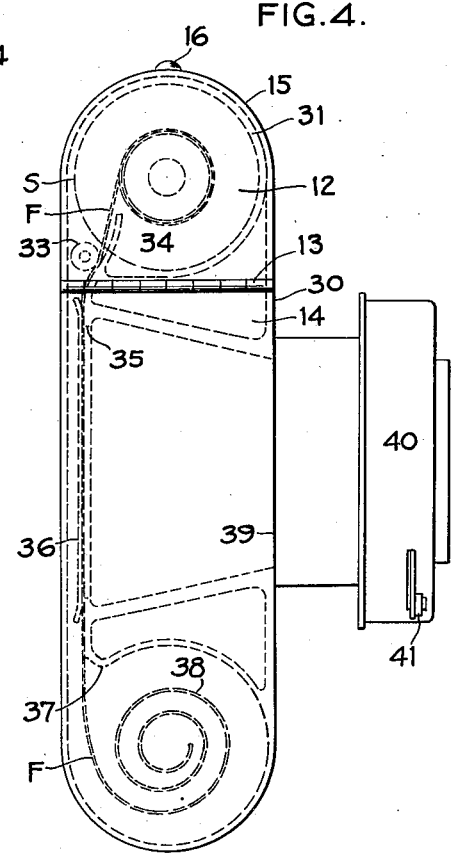
Fig. 4 illustrates a typical camera including a film-supporting shaft in which my improved form of film spool may be used.

While the camera itself forms no part of my present invention and may be along the lines of the Mihalyi camera, shown in the Patent 2,336,278 above referred to, such a camera is diagrammatically shown in Fig. 4 as consisting of a camera body 30 having an upper wall 14 supporting a hinged wall 12, the end wall of which 15 may have a latch 16 by which it is held in a closed position. Inside of these walls there is a spool chamber 31 into which my improved form of film spool, designated broadly as "S," may be loaded on a film spool supporting shaft 5. By turning the knurled knob 12, film "F" may be propelled from the spool between a guide roll 33 and a guide plate 34 which are suitably shaped into an exposure position behind the exposure frame 35. The usual type of presser member 36 holds the film flat on the exposure frame and the film may be wound into a loose coil at 38 after being propelled into this coil which lies in a take-up chamber 37. The front wall 39 of the camera may have the usual lens and shutter 40, the shutter having a trigger 41 for making exposures in the normal manner.

It will be noticed that by utilizing readily-bendable fingers formed directly of the metal of the film spool flange that no additional parts are required, and that these fingers serve to indicate that a film spool has not been used in a camera when the fingers lie flat, or flush, with the flange. However, as soon as the spool is inserted on the film-supporting post these fingers will have to be bent outwardly and when the spool is removed from the camera, the user will know that the spool has been used in a camera and that the film is therefore probably exposed. Of course, it is possible to insert a spool in a camera and immediately remove it without exposing film so this cannot be considered a completely foolproof signal but, nevertheless, this possibility is so remote that it need not be considered.

I claim:

A film spool and signal for use in a camera having a film support comprising a shaft polygonal at one end and round at the other end on which the film spool may be mounted with the spool flanges engaging the shaft, said film spool comprising a hub encircling the shaft flanges attached to the hub, one flange having a polygonal opening complementary in shape to the polygonal end of the shaft, the other flange having a round opening complementary in shape to the round end of the shaft, the flange having the round opening being made of a soft bendable metal and normally lying in a plane at right angles to the hub, an inwardly extending signal finger extending into the round opening and having lateral edges extending rearwardly into the flange and separated therefrom by slots, said signal finger normally lying in the plane of the flange whereby the finger may be bent away from the plane of the flange and into a noticeable signalling position by placing the spool on the camera supporting shaft, thereby causing said shaft to move the signal fingers from the plane of the flange as the round end of the shaft passes through the round opening in the flange, said signalling finger retaining its bent outwardly extending position from the plane of the flange because of the soft bendable material of which the flange is made.

KENNETH A. HENDEL.

REFERENCES CITED

The following references are of record in the file of this patent:

UNITED STATES PATENTS

| Number | Name | Date |
| --- | --- | --- |
| 2,099,646 | Busch | Nov. 16, 1937 |